United States Patent [19]

Carrick et al.

[11] Patent Number: 4,558,105
[45] Date of Patent: Dec. 10, 1985

[54] COPOLYMERIZATION OF ETHYLENE

[75] Inventors: Wayne L. Carrick, Long Grove; R. Sven Solvik, Barrington, both of Ill.; William Kirch, Clinton, Iowa

[73] Assignee: Chemplex Company, Rolling Meadows, Ill.

[21] Appl. No.: 558,928

[22] Filed: Dec. 7, 1983

[51] Int. Cl.$^4$ ............................................. C08F 10/02
[52] U.S. Cl. ...................................... 526/68; 526/70; 526/73
[58] Field of Search .................................... 526/73, 68

[56] References Cited

U.S. PATENT DOCUMENTS

| 4,014,859 | 3/1977 | Cooper et al. ..................... 526/73 X |
| 4,105,609 | 8/1978 | Machon et al. . |
| 4,105,842 | 8/1978 | Nicco et al. . |
| 4,168,356 | 9/1979 | Lavresse et al. . |
| 4,269,948 | 5/1981 | Nicco ..................................... 525/53 |
| 4,469,855 | 9/1984 | Cooper ............................. 526/68 X |

FOREIGN PATENT DOCUMENTS

| 120503 | 10/1984 | European Pat. Off. . |
| WO84/3889 | 10/1984 | PCT Int'l Appl. |
| 1043633 | 9/1966 | United Kingdom .................. 526/65 |
| 2066274 | 7/1981 | United Kingdom . |

Primary Examiner—Joseph L. Schofer
Assistant Examiner—S. Babajko
Attorney, Agent, or Firm—Wood, Dalton, Phillips, Mason & Rowe

[57] ABSTRACT

Ethylene is copolymerized with one or more 1-olefins under conditions of high temperature and pressure in the presence of an inert gaseous ratio modifier. As a result, liquid condensation which contributes to equipment damage and unsafe operation is avoided, and copolymer product density is readily controllable.

8 Claims, 4 Drawing Figures

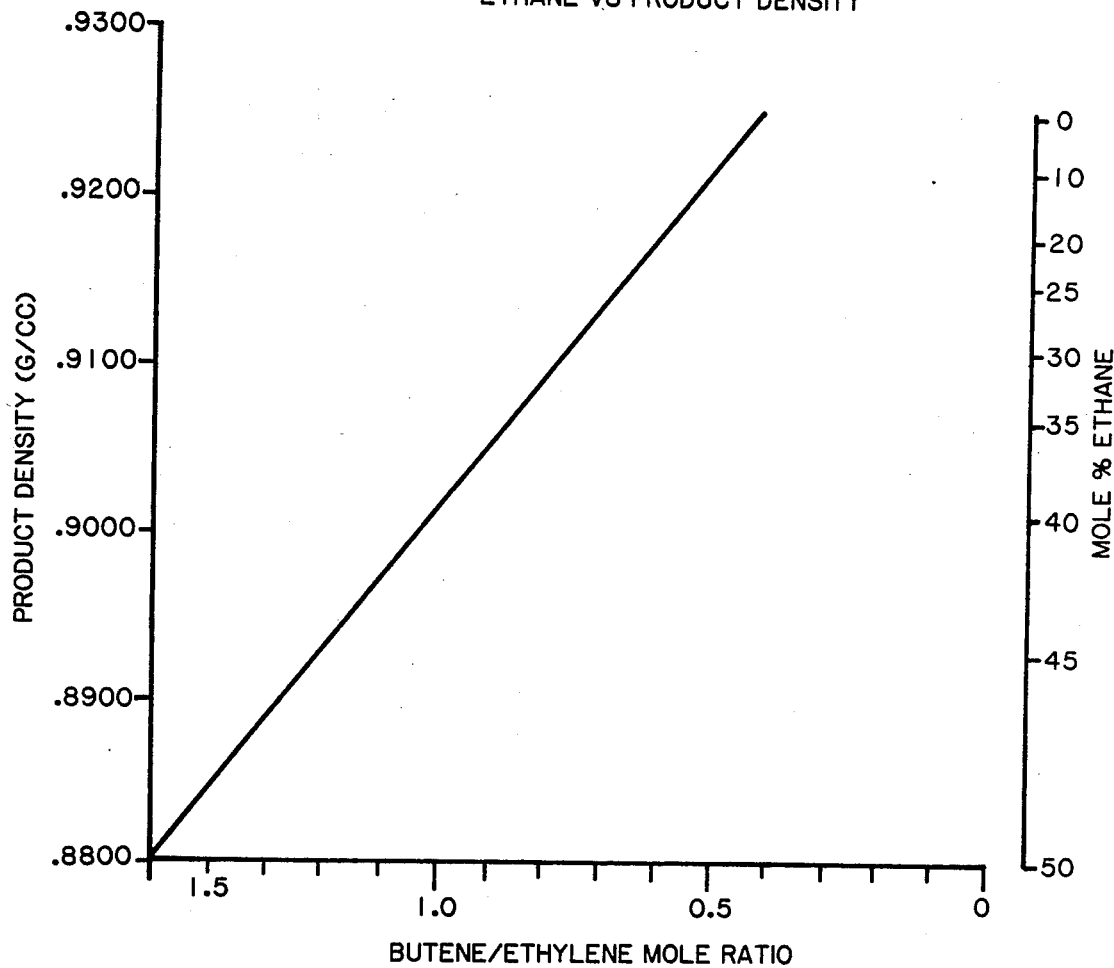

COPOLYMERIZATION OF ETHYLENE

BACKGROUND OF THE INVENTION

1. Field of the Invention

This invention relates generally to the copolymerization of ethylene with 1-olefins and, more specifically, this invention relates to the high temperature and high pressure copolymerization of ethylene and 1-olefins to produce low density ethylene copolymers.

2. Description of the Prior Art

The copolymerization of ethylene with 1-olefins under high pressure, high temperature conditions to produce low density polyethylene copolymer resins is well known. Such systems generally utilize coordination metal catalysts (such as so-called Ziegler catalysts, for example) and 1-olefin comonomers such as propylene, 1-butene, 1-hexene, etc. to produce resins having densities within the range of about 0.92 g/cc to about 0.94 g/cc.

The density of an ethylene copolymer is inversely related to the degree of incorporation in the polymer chain of the 1-olefin comonomer. Since the reactivities of such comonomers are relatively low compared to the reactivity of ethylene, prior practice has been to utilize a relatively high concentration of comonomer in the reaction mixture with ethylene, in order to produce low density products.

Unfortunately, the use of relatively high concentrations of 1-olefin comonomers results in an undesirable increase in the dew point of the reaction mixture, which in turn results in undesirable condensation of liquid from the reaction mixture, contributing to possible equipment damage and unsafe operating conditions in low pressure recycle compression systems of conventional low density polymer plants. Also, the use of relatively high concentrations of 1-olefin comonomers limits the lowest achievable product density, and prevents the use of higher boiling point comonomers in copolymerization.

One solution to this problem has been to provide facilities to condense and separate 1-olefin comonomers from normally gaseous recycle streams, followed by injection of the liquid comonomer stream into a recycle stream at a relatively high pressure. However, this requires expensive equipment and results in a substantial increase in the energy cost per pound of product.

Another problem associated with the use of relatively high levels of 1-olefin comonomers is the presence of unreacted high boiling point comonomers in the molten polyolefin product stream. The presence of unreacted monomer at high concentrations can result in polymer foaming and problems in feeding the product extruder. Removal of unreacted comonomer from the product stream may require expensive vacuum separation equipment.

SUMMARY OF THE INVENTION

It is an object of the invention to overcome one or more of the problems described above.

According to the present invention, ethylene is catalytically copolymerized with at least one 1-olefin comonomer having between 3 and 8 carbon atoms in its main chain under high temperature, high pressure polymerization conditions in the presence of a low molecular weight inert gas ratio modifier. The ratio modifier is present in an amount sufficient to maintain the dew point of the reaction mixture of ethylene, comonomer and ratio modifier below the lowest temperature encountered by the reaction mixture in the polymerization system.

As a result, the polymerization process may operate using otherwise conventional low density polymerization process equipment without the need for facilities to accomplish condensation, separation and reinjection of comonomer from and into the normally gaseous reactant recycle stream.

Another advantage of the invention is the improvement of the degree of incorporation of comonomer into the copolymer product chain in order to minimize the concentration of comonomer required to produce a resin product of a desired low density.

By means of selection of the respective proportions of comonomer, ratio modifier and ethylene present in the reaction mixture, the copolymer resin product density may be independently controlled.

Further, since the proportion of relatively high boiling point comonomer in the reaction mixture is limited by means of the invention, the presence of unreacted comonomer in the molten product polyolefin stream leaving the reaction system is eliminated or minimized, thus reducing and often eliminating the need for removal of comonomer from the product stream by means of expensive vacuum systems.

These and other advantages of the invention will be readily apparent from the following detailed description of the invention, taken in conjunction with the drawings and the appended claims.

DETAILED DESCRIPTION OF THE INVENTION

Figure 1:
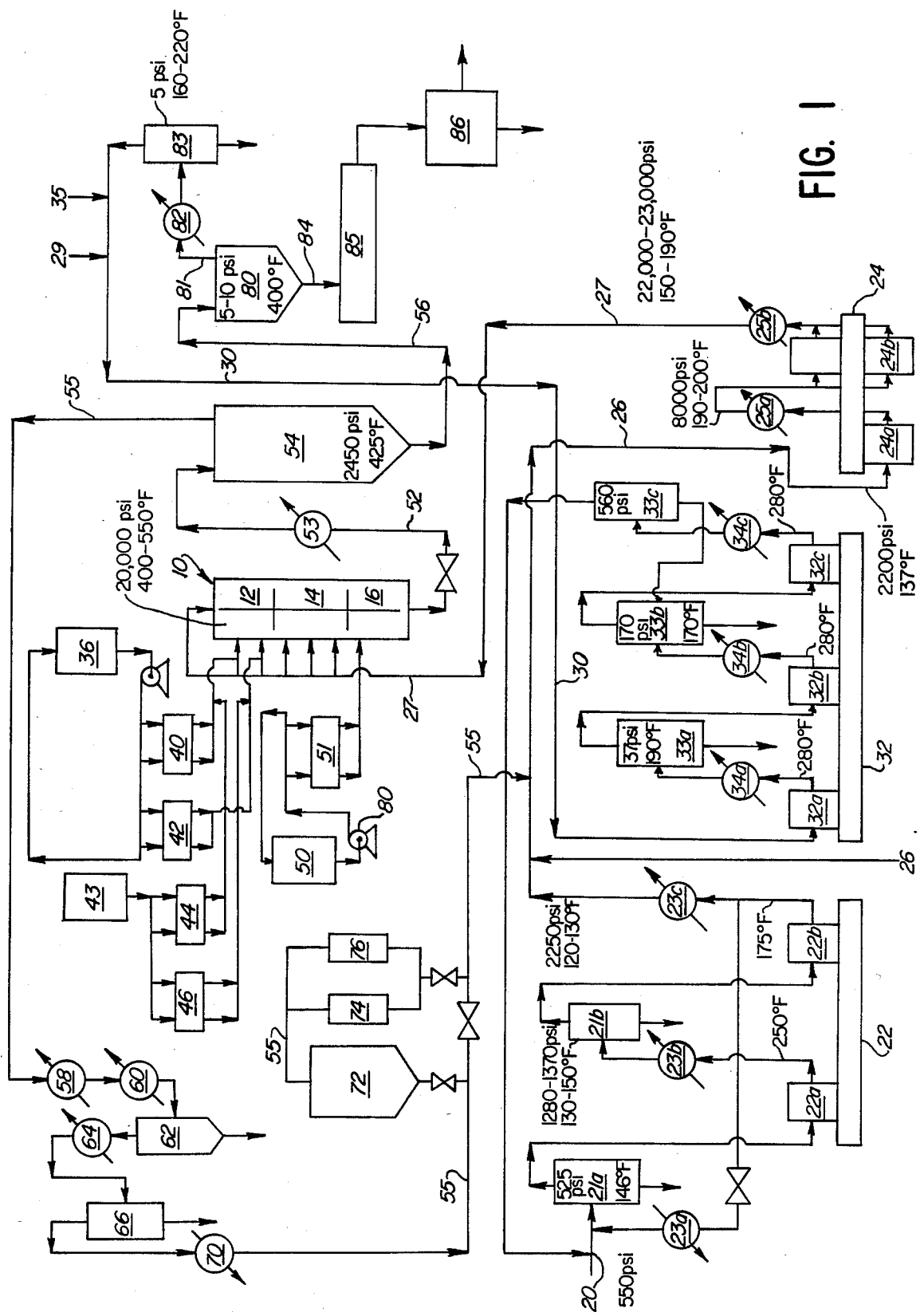
FIG. 1 is a schematic process flow diagram illustrating a reaction system suitable for carrying out one embodiment of the invention.

According to the present invention, ethylene is catalytically copolymerized with at least one 1-olefin comonomer in the presence of an inert, low molecular weight gaseous ratio modifier under conditions of high temperature and pressure to form polyethylene copolymers having densities generally in the range of less than about 0.87 g/cc to about 0.94 g/cc.

As used herein with respect to the essential inert low molecular weight gas, the term "ratio modifier" is to be distinguished from hydrogen or other chain transfer agents which are known in the art to affect product molecular weight, molecular weight distribution or other product properties.

The ratio modifier is present in the reaction mixture in an amount sufficient to maintain the dew point of the mixture below the lowest temperature encountered by the reaction mixture in the reaction system, thus preventing unwanted condensation of comonomer, especially at the point of low pressure recycle compression in the system.

Use of the ratio modifier results in the production of low density copolymer resins at relatively low comonomer concentration levels in the reaction mixture. Because the reactivity of ethylene is higher than the reactivities of higher molecular weight 1-olefin comonomers, relatively high concentrations of comonomer in the reaction mixture have been required in the past in order to achieve product densities of less than about 0.93 g/cc.

At such high comonomer concentrations (i.e., greater than about 30 mole percent), the comonomer must be condensed out of the low pressure recycle stream in order to prevent mechanical damage and unsafe operating conditions in the low pressure recycle gas compressors conventionally used in low density polyethylene plants. The condensed comonomer must then be purified and pumped back into the reaction feed stream. This requires additional process facilities and relatively high energy consumption per pound of product.

The presence of excess comonomer in the product stream can result in polymer foaming and, ultimately, problems in feeding the product extruder. Furthermore, the presence of relatively high concentrations of 1-olefin comonomer in prior copolymerization systems has limited the lowest achievable product density, and copolymerization of ethylene with relatively high boiling point comonomers has been impractical.

The present invention utilizes a ratio modifier in the reaction mixture to favorably shift the mole ratio of comonomer to ethylene in the reaction mixture required to achieve a desired low product density. By the use of a sufficient concentration of the ratio modifier, the comonomer concentration compared to ethylene is increased, while the comonomer concentration in the total gaseous reaction mixture is maintained sufficiently low to permit the relatively low pressure recycle stream to be processed through conventional compressor systems without the need to condense comonomer followed by reinjection to the recycle stream.

Additionally, the concentration of the ratio modifier in the reaction mixture may be varied over a wide range in order to result in ethylene copolymer resins having densities well below those achieved by conventional processes. This results in ready control of product density by means of selection of ratio modifier concentration in the reaction mixture.

The presence of the ratio modifier in the reaction stream appears to promote a more uniform incorporation of comonomer into the copolymer chain, which enhances the optical and strength properties of the resin in applications for cast and blown film, and other applications where low crystallinity is desired.

Also, the concentration of unreacted comonomer in the stream is minimized, thus reducing or eliminating the need to remove the comonomer, which generally requires expensive vacuum suction, or similar, equipment. Polymer foaming and product extruder feeding problems are minimized or eliminated.

According to the invention, it is possible to copolymerize ethylene with higher comonomers having relatively low reactivity ratios.

Reactants and Reaction Conditions

According to the present invention, ethylene is copolymerized with one or more comonomers which comprise 1-olefins having between 3 and 8 carbon atoms in their main carbon chains. The 1-olefin comonomers may be substituted or unsubstituted. Olefins such as propylene, 1-butene, 1-hexene, 1-octene and substituted comonomers such as 4-methyl-pentene-1 are preferred.

The ratio modifier may be any inert, low molecular weight gas which exhibits pumping characteristics which are suitable for use in conventional low density polyethylene polymerization plants and which are not susceptible to condensation under temperature and pressure conditions encountered in such plants. Preferred ratio modifiers include methane, ethane, propane and nitrogen, or mixtures thereof.

The advantages of the invention are accomplished by mixing the ratio modifier with ethylene and the comonomer in the high pressure, high temperature reaction system, providing sufficient ratio modifier to maintain the dew point of the gaseous comonomer/ethylene/ratio modifier reaction mixture at a temperature which is below the lowest temperature encountered by the reaction mixture at any given point in the reaction system.

As is well known in the art, the dew point of a gaseous ethylene/1-olefin mixture increases with increasing comonomer concentration. Thus, one function of the ratio modifier is to maintain the concentration of comonomer in the reaction mixture at a level which is sufficiently low that the reaction mixture dew point remains substantially below the temperature encountered by the mixture at any point in the reaction system. Thus, undesirable condensation of comonomer is avoided.

As used herein, the terms "high temperature" and "high pressure" are understood to have the meanings generally recognized by those skilled in the art, and embrace a temperature range of about 300°–600° F., and a pressure range of about 10,000 to 20,000 psi, respectively. Under such temperature and pressure conditions according to the invention sufficient ratio modifier is present in the reaction mixture to maintain the comonomer concentration at or below about 30 to 35 mole percent. (This concentration is the approximate maximum concentration of 1-butene, and the maximum comonomer concentration may vary slightly depending on the particular comonomer used. For example, the maximum concentration of propylene comonomer is about 70 mole percent.)

The ratio modifier may comprise up to 70 or 80 mole percent of the reaction mixture, but preferably comprises less than about 50 to 60 mole percent. Ethylene, a comonomer (such as 1-butene, for example) and a chain transfer agent or other modifier, if used, comprise the balance of the reaction mixture.

The reaction system may comprise any reactor and associated equipment which are suitable for the copolymerization of ethylene and 1-olefins at high temperature and pressure. Similarly, any catalyst which is suitable for such copolymerization may be used, although coordination metal type catalysts, especially of the so-called Ziegler type, are preferred. Suitable types of catalysts are identified in Cooper et al U.S. Pat. No. 4,014,859 (Mar. 29, 1977), the disclosure of which is hereby incorporated herein by reference.

As is well known in the art, the catalyst may be supported or unsupported.

Referring now to the drawing Figures, a polymerization reaction system suitable for use in accordance with this invention will be described in detail. Unnecessary limitations should not be inferred from the following description or from the accompanying Examples, as they are intended to be illustrative only, and obvious modifications will be apparent to those skilled in the art.

As stated above, the invention can be utilized in conventional high pressure, high temperature ethylene polymerization units, such as those well known to those skilled in the art. The reaction system includes a reactor which may be tubular, an autoclave, etc. For purposes of illustration, an autoclave reactor system is shown in FIG. 1.

The copolymerization reaction is carried out in a single-or multiple-zone stirred reaction vessel, generally designated 10. For illustration, a three-zone reactor is shown, and comprises reaction zones 12, 14 and 16. The reaction is carried out at an elevated temperature (e.g., 300° to 600° F.) and pressure (e.g., 10,000 to 20,000 psi). (Exemplary process temperatures and pressures are indicated in FIG. 1.)

Ethylene is compressed to the desired reaction pressure in a closed loop recycle system with make-up ethylene injected at a point 20 into the suction side of a multi-stage primary compressor 22 having stages 22a and 22b, intermediate separators 21a and 21b, and intermediate coolers 23a, 23b and 23c. The ethylene then flows through a multi-stage secondary compressor 24 having stages 24a and 24b and coolers 25a and 25b and into the reactor zones 12 and 14.

Make-up comonomer (1-butene, for example) is injected through a line 26 into the suction side (stage 24a) of the secondary compressor 24 and then into the reactor zones 12 and 14.

The ratio modifier (ethane, for example) is injected at a point 29 through a line 30 into the suction side (stage 32a) of a multi-stage flash gas compressor, generally designated 32, having stages 32a, 32b and 32c, separators 33a, 33b and 33c and intermediate coolers 34a, 34b and 34c. The ratio modifier then flows through the primary and secondary compressors 22 and 24 and a line 27 into the reactor zones 12 and 14.

If desired, hydrogen is added at a point 35 into the suction side (stage 32a) of the flash gas compressor 32, then through the primary and secondary compressors 22 and 24 and into the reactor zones 12 and 14. (Hydrogen is a well known molecular weight modifier used in coordination metal catalyst polymerization systems.)

Catalyst from a catalyst mix tank 36 is injected through one of two pumps 40 or 42 into the reactor zone 12 and, optionally, the zone 14. Cocatalyst from a cocatalyst tank 43 is injected through one of two pumps 44 or 46 into the reactor zone 12 and, optionally, the zone 14.

A catalyst deactivating agent from a tank 50 is injected through a pump 51 into the reactor zone 16 in order to deactivate the catalyst and stop polymerization in order to prevent uncontrolled polymerization downstream of the reactor, which could result in polymer decomposition and/or degradation, fouling of exchangers and compressors, etc.

The reaction stream 52 exiting the reactor 10 flows through a cooler 53 to a high pressure separator 54 where its pressure is decreased from the reactor pressure (10,000 to 20,000 psi) to about 2,000 to 3,000 psi. In the separator 54, the reaction stream 52 separates into two phases, a vapor overhead stream 55 and a molten polymer stream 56 which contains some dissolved unreacted ethylene and comonomer.

The overhead vapor stream 55 containing the bulk of unreacted ethylene and comonomer, together with the ratio modifier, passes through a series of coolers and knockout vessels 58, 60, 62, 64, 66 and 70 to remove any dissolved or entrained polymer waxes, and then flows through an absorber vessel 72 packed with alumina and molecular sieves to remove any impurities which may affect catalyst productivity. The stream 55 then flows through one of two filters 74 or 76 to the suction side of the secondary compressor 24 for repressuring and injection back into the reactor zones 12 and 14.

The molten polymer stream 56 from the high pressure separator 54 flows into a low pressure separator 80, which operates at a pressure of about 5 to 15 psi, where most of the remaining unreacted ethylene and comonomer flash to an overhead stream 81 which is cooled in a cooler 82 and high-boiling liquid (e.g., mineral spirits) is separated therefrom in a separator 83 prior to recompression to reactor pressure in the flash gas compressor 32, primary compressor 22 and secondary compressor 24.

A molten polymer stream 84 from the low pressure separator 80 flows into a melt extruder 85 where it is converted to pellet form by an underwater pelletizer and ultimately separated and recovered in a dryer 86.

EXAMPLES

The method of the invention will be illustrated in the following specific Examples, but the scope of the invention is not to be limited thereby.

Examples 1 (Comparative) and 2 (Invention)

Copolymerization of ethylene and 1-butene was carried out in a reaction system as described above in connection with FIG. 1, using a titanium catalyst and an alkyl aluminum cocatalyst under the polymerization conditions shown in Table I below. Ethane was present in the reaction mixture in the amount shown in Table I.

In Example 1 (a comparative example) only a small amount (4.4 mole %) of ethane was present in the reaction feed stream with 30.0 mole % 1-butene and the remainder ethylene. The resin product had a melt index of 1.96 and a density of 0.9250 g/cc.

An increase in the ethane concentration to 32.0 mole %, with 28.0 mole % 1-butene, the remainder being ethylene, resulted in a product resin having a melt index of 1.88 and a density of 0.9150 g/cc.

TABLE I

| | | (Examples 1 and 2) | | | | |
|---|---|---|---|---|---|---|
| Example | Rxn. Temp. (°F.) | Rxn. Press. (psi.) | Ethane Conc. (mole %) | Butene-1 Conc. (mole %) | Melt Index (g/10 min) | Density (g/cc) |
| 1 | 445 | 20,000 | 4.4 | 30.0 | 1.96 | 0.9250 |
| 2 | 410 | 20,000 | 32.0 | 28.0 | 1.86 | 0.9150 |

Example 3 (Invention)

Figure 2:
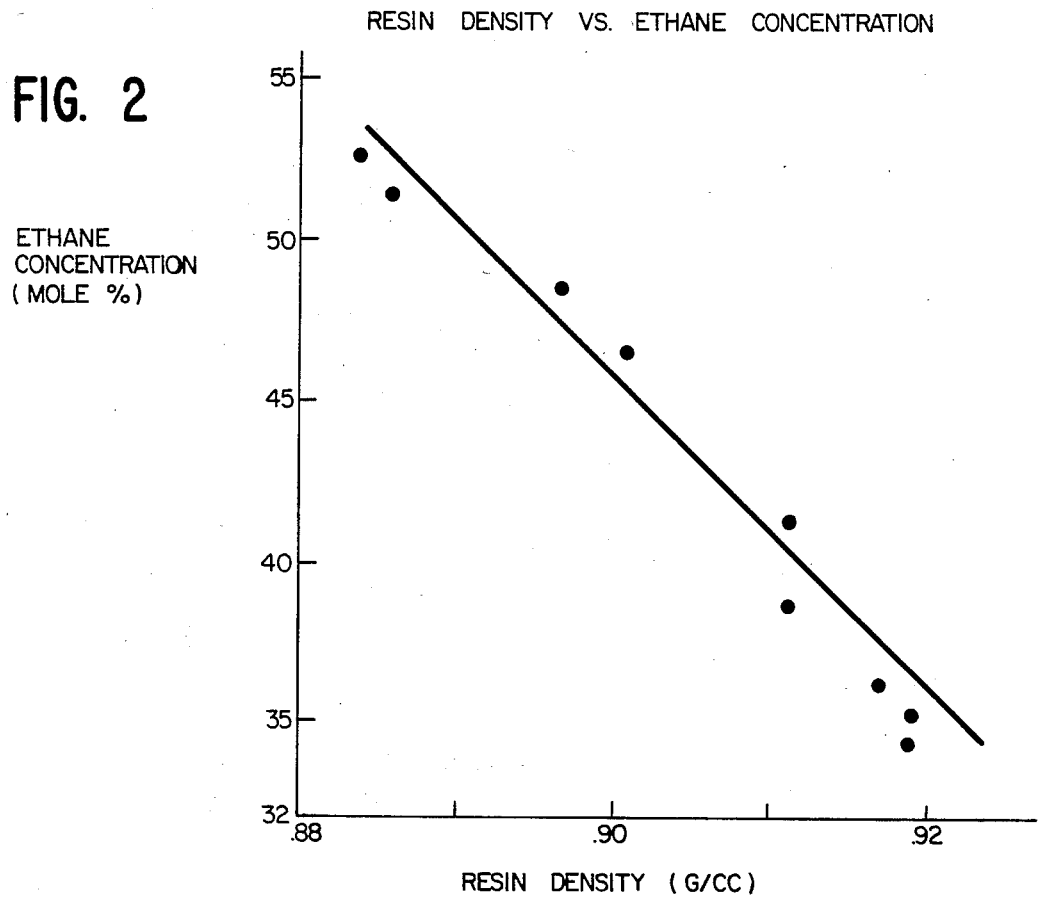
FIG. 2 is a plot of copolymer product density vs. ethane concentration in one system for the copolymerization of ethylene and 1-butene according to one embodiment of the invention.

Using the catalyst of Examples 1 and 2 in the reaction system of FIG. 1, a traverse of ethane concentrations from 34.2 to 52.8 mole % was made under the reaction conditions shown in Table II below. A reduction in product density was attained with increases in ethane concentration, as shown in Table II and as illustrated in FIG. 2.

The copolymer resin density of 0.8838 g/cc produced in Run "j" is much lower than densities obtainable with prior low density polyethylene copolymerization processes.

TABLE II (Example 3)

| Run | Rxn. Temp. (°F.) | Rxn. Press. (psi.) | Ethane Conc. (mole %) | Butene-1 Conc. (mole %) | Melt Index (g/10 min) | Density (g/cc) |
|---|---|---|---|---|---|---|
| a | 430 | 20,000 | 34.2 | 27.3 | 4.5 | 0.9187 |
| b | 432 | 20,000 | 35.2 | 26.2 | 5.8 | 0.9192 |
| c | 429 | 20,000 | 27.1 | 26.5 | 5.8 | 0.9173 |
| d | 429 | 20,000 | 38.7 | 26.5 | 6.3 | 0.9115 |
| e | 422 | 20,000 | 41.1 | 26.4 | 6.2 | 0.9116 |
| f | 431 | 20,000 | 43.6 | 27.3 | 9.2 | 0.9057 |
| g | 426 | 20,000 | 46.7 | 25.6 | 9.9 | 0.9010 |
| h | 412 | 20,000 | 48.8 | 25.6 | 9.2 | 0.8973 |
| i | 400 | 20,000 | 51.5 | 26.9 | 14.4 | 0.8860 |
| j | 395 | 20,000 | 52.8 | 27.2 | 13.9 | 0.8838 |

Example 4 (Invention)

A series of copolymerization tests were carried out in the reaction system of FIG. 1 using a second titanium catalyst and an alkyl aluminum cocatalyst at the reaction conditions shown in Table III, below. A traverse of ethane concentrations was made within the range of 14.8 to 27.6 mole % at an approximately constant 1-butene concentration of about 32-33 mole %. The data of Table III illustrates the controllability of product density by selection of ethane concentration.

TABLE III (Example 4)

| Run | Rxn. Temp. (°F.) | Rxn. Press. (psi.) | Ethane Conc. (mole %) | Butene-1 Conc. (mole %) | Melt Index (g/10 min) | Density (g/cc) |
|---|---|---|---|---|---|---|
| a | 421 | 20,000 | 14.8 | 33.2 | — | 0.9248 |
| b | 421 | 20,000 | 20.6 | 32.5 | — | 0.9223 |
| c | 421 | 20,000 | 27.6 | 32.2 | 2.46 | 0.9181 |

Example 5

Ethylene and 1-butene were copolymerized in the reaction system of FIG. 1 using a third titanium/alkyl aluminum catalyst under the polymerization conditions shown in Table IV, below. In this case, methane was used in place of ethane as the ratio modifier in Run "b", and no ratio modifier was used in Run "a". The density reduction achieved by the use of methane as a ratio modifier is apparent.

TABLE IV (Example 5)

| Run | Rxn. Temp. (°F.) | Rxn. Press. (psi.) | Methane Conc. (mole %) | Butene-1 Conc. (mole %) | Melt Index (g/10 min) | Density (g/cc) |
|---|---|---|---|---|---|---|
| a | 421 | 20,000 | 0 | 30.1 | 3.8 | 0.927 |
| b | 410 | 20,000 | 30.3 | 30.1 | 4.1 | 0.919 |

Example 6 (Invention)

Ethylene was copolymerized with 1-butene in the reaction system of FIG. 1 utilizing a catalyst prepared as described below in accordance with the disclosure of U.S. Pat. No. 4,499,198 issued Feb. 12, 1985 to Thomas J. Pullukat et al, and assigned to the assignee hereof. The disclosure of U.S. Pat. No. 4,499,198 is hereby incorporated herein by reference.

The 1-butene concentration was maintained at a relatively constant level between about 30 and 33 mole %, and a traverse of ethane concentrations between about 32 and 44 mole % was generated. As seen in Table V, below, a reduction in product density from about 0.918 to about 0.901 is apparent.

TABLE V (Example 6)

| Run | Rxn. Temp. (°F.) | Rxn. Press. (psi.) | Ethane Conc. (mole %) | Butene-1 Conc. (mole %) | Density (g/cc) |
|---|---|---|---|---|---|
| a | 414 | 20,000 | 32.1 | 30.1 | 0.9182 |
| b | 400 | 20,000 | 36.3 | 30.4 | 0.9120 |
| c | 400 | 20,000 | 44.1 | 33.1 | 0.9011 |

The catalyst utilized in Example 6 was prepared as follows:

A 150 gallon vessel equipped with a conventional agitator was rinsed with a quantity of Isopar H (a hydrocarbon solvent product of Exxon Corporation with a boiling point range of 176°-191° C., and a specific gravity of 0.760 at 60° F.) The vessel was then thoroughly purged with nitrogen. The entire catalyst preparation was conducted with the exclusion of air to protect the catalyst from possible poisons.

About 120 pounds Isopar H was added to the vessel, followed by 145 pounds of a 0.62M solution of n-butylmagnesium bis(trimethylsilyl) amide (0.74 g/mL density at 25° C.). After the addition of the BMSA, the connecting pipe line between the BMSA reservoir and the preparation vessel was rinsed with 10 pounds of Isopar H.

A 245 pound quantity of ethyl aluminum dichloride solution (25.0 wt. % in Isopar H) was then added with stirring over a period of time sufficient to produce a uniform slurry. During this stage the mixture temperature was about 55° C.

After addition of the ethyl aluminum dichloride, the connecting line was rinsed with 10 pounds of Isopar H. The reaction product was agitated for about 1 hour and then 42 pounds (22 liters) of a 1.0M Isopar H solution of titanium tetrachloride was slowly added. The mixture temperature remained at about 55° C.

Upon completion of the titanium tetrachloride addition, the connecting line was flushed into the preparation vessel with 10 pounds of Isopar H.

After cooling, the resulting catalyst slurry was transferred without exposure to air to storage containers.

A sample of the slurry was analyzed and found to contain 17.08 mg/mL of aluminum, 3.91 mg/mL of magnesium and 3.29 mg/mL of titanium.

Figure 3:
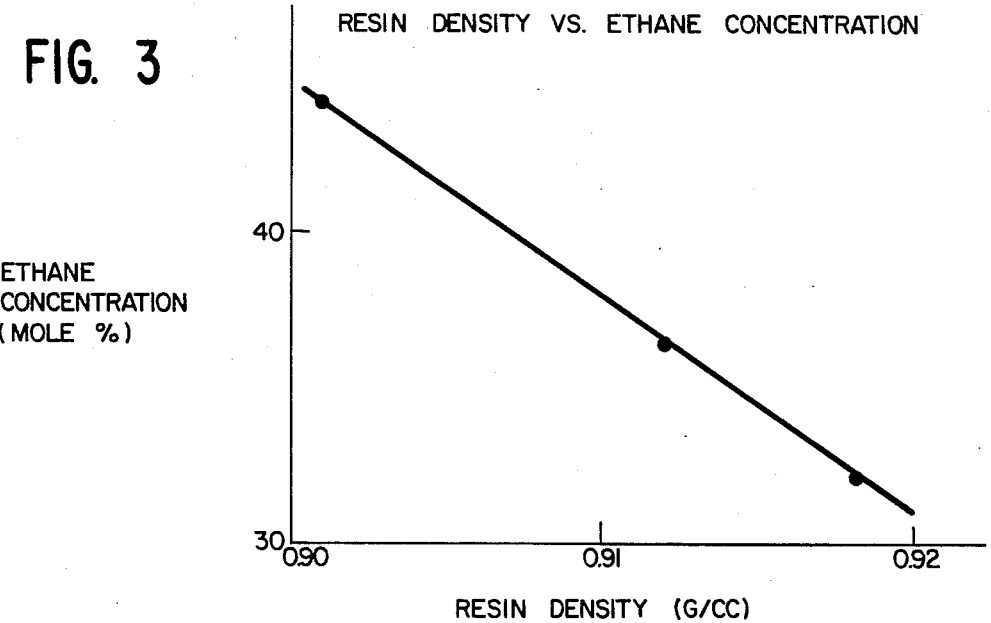
FIG. 3 is a plot of copolymer product density vs. ethane concentration in another system for the copolymerization of ethane and 1-butene according to one embodiment of the invention; and, FIG. 4 is a plot of copolymer product density vs. the ratio of 1-butene to ethylene in a copolymerization system utilizing a constant concentration of butene and a variable concentration of an ethane ratio modifier according to one embodiment of the invention.

A plot of copolymer product density vs. concentration of ethane diluent is shown in FIG. 3.

Example 7 (Invention)

1-butene was copolymerized with ethylene at a reaction pressure of about 20,000 psi and a reaction temperature of about 430° F. in the presence of varying concentrations of ethane.

The reaction system was that of FIG. 1, and the catalyst was the catalyst used in Examples 1-3, above. The concentration of 1-butene was held essentially constant at about 30 mole % and ethane was provided in varying concentrations.

FIG. 4 illustrates the ethane concentration (mole %) required to achieve a desired product density if the 1-butene concentration is maintained at a constant 30 mole %.

An examination of FIG. 4 makes it apparent that an increase in the proportion of ethane from 0 to 50 mole % while maintaining the 1-butene concentration at 30 mole % resulted in a decrease of product density from about 0.925 g/cc to about 0.88 g/cc or below.

Thus, the ready controllability of product density by selection of appropriate ratio modifier concentration in the reaction mixture is apparent.

Example 8 (Invention)

Using the catalyst described in Example 6, ethylene and propylene were copolymerized in the reaction system of FIG. 1 using ethane as the ratio modifier. As shown in Table VI, ethylene/propylene copolymers were produced at density levels of 0.9175 and 0.9058 g/cc using 30 mole % propylene and 30 and 40 mole % ethane, respectively.

TABLE VI

| | | | (Example 8) | | |
|---|---|---|---|---|---|
| Run | Rxn Temp. (°F.) | Rxn Press. (psi) | Ethane Conc. (mole %) | Propylene Conc. (mole %) | Density (g/cc) |
| a | 400 | 20,000 | 30.0 | 30.0 | 0.9175 |
| b | 400 | 20,000 | 40.0 | 30.0 | 0.9058 |

Example 9 (Invention)

Using the catalyst described in Example 6, ethylene and 1-hexane were copolymerized in the reaction system of FIG. 1, using ethane as the ratio modifier. As shown in Table VII, an ethylene/hexane-1 copolymer was produced.

TABLE VII

| | | | (Example 9) | | |
|---|---|---|---|---|---|
| Run | Rxn Temp. (°F.) | Rxn Press. (psi) | Ethane Conc. (mole %) | Hexene-1 Conc. (mole %) | Density (g/cc) |
| a | 400 | 20,000 | 40.3 | 5.0 | 0.935 |

The foregoing detailed description is given for clearness of understanding only, and no unnecessary limitations are to be inferred therefrom, as variations within the scope of the invention will be obvious to those skilled in the art.

We claim:

1. A method of copolymerizing ethylene with at least one comonomer comprising a 1-olefin having three to eight carbon atoms in the main chain thereof, said method comprising the step of reacting a gaseous mixture of said ethylene and said comonomer in the presence of a coordination metal copolymerization catalyst in a reactor of a reaction system comprising said reactor and a recycle system operating at a pressure and temperature lower than those of said reactor, said reaction being carried out at a temperature of about 300° F. to about 600° F. and at a pressure of about 10,000 psi to about 20,000 psi, said gaseous mixture further including a low molecular weight inert gas ratio modifier selected from the group consisting of methane, ethane and nitrogen, and mixtures thereof, in a concentration sufficiently high to maintain the dew point of said gaseous mixture below the lowest temperature encountered by said mixture in said reaction system and to maintain the ratio of said comonomer to said ethylene sufficiently high to produce copolymers having densities of about 0.94 g/cc or below.

2. The method of claim 1 wherein said comonomer is selected from the group consisting of propylene, 1-butene and 1-hexene.

3. The method of claim 2 wherein said comonomer comprises 1-butene and said gaseous mixture comprises less than about 35 mole percent 1-butene, less than about 80 mole percent of said ratio modifier, and the balance ethylene for a total of 100 mole percent.

4. The method of claim 3 wherein said gaseous mixture further includes a chain transfer agent.

5. The method of claim 4 wherein said chain transfer agent is hydrogen.

6. The method of claim 3 wherein said ratio modifier is ethane, said 1-butene comprise less than about 30 mole percent of said reaction mixture, and the molar ratio of 1-butene to ethylene is greater than about 0.5.

7. The method of claim 1 wherein said temperature, pressure, comonomer, ratio modifier and concentrations of comonomer and ratio modifier are selected to produce copolymers having densities in the range of about 0.87 to 0.94 g/cc.

8. The method of claim 7 wherein said comonomer is butene-1, said ratio modifier is ethane, and said temperature, pressure and concentrations are selected to produce copolymers having densities in the range of about 0.88 to 0.92 g/cc.

* * * * *